July 16, 1963 W. STUMMER 3,097,750
DEVICE FOR TRANSLATING AXIAL MOTION INTO SWINGING MOTION
Filed July 8, 1960
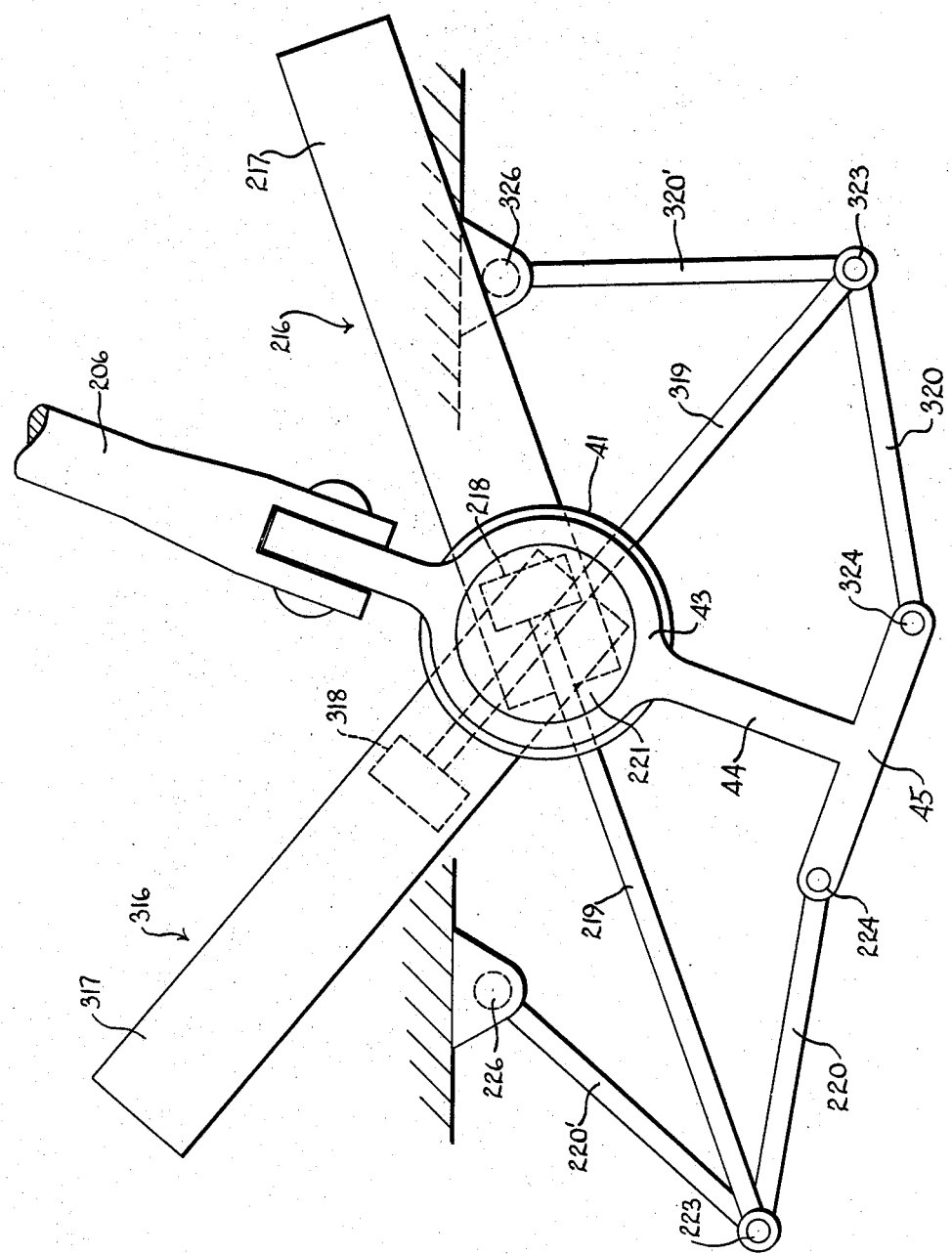
Wilfried Stummer

United States Patent Office 3,097,750
Patented July 16, 1963

3,097,750
DEVICE FOR TRANSLATING AXIAL MOTION INTO SWINGING MOTION
Wilfried Stummer, Stubbenhuk 10, Hamburg, Germany
Filed July 8, 1960, Ser. No. 41,689
3 Claims. (Cl. 212—66)

This invention relates to apparatus for translating axial motion of a reciprocatory actuator, such as a double acting hydraulic operator, into swinging or rotating motion of a pivotally or hingedly mounted member such as the jib or arm of a crane.

In general it is an object of this invention to provide apparatus for translating the axial motion of a double acting hydraulic operator or the like into swinging or turning motion of a jib or other part with which the work performing member of the operator is connected, and whereby the axial driving force exerted by the operator can be converted into very high torque moments about the turning axis of the part.

A more specific object of the invention resides in the provision of a linkage structure by which a hydraulic operator or similar axially reciprocable actuator can be connected with a structural element which is swingable or rotatable about an axis that is fixed with respect to one of the relatively reciprocable members of the operator, and which linkage structure, although very compact, nevertheless provides for the application of extremely large torsional moments to the actuated element, particularly during the initial portion of its swinging or rotational movement, so as to insure rapid acceleration of the element and to provide for relatively gradual deceleration of its motion.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The single FIGURE is a more or less diagrammatic horizontal sectional view through the swingable knuckle member of a jib or arm of a crane, illustrating an embodiment of the invention.

The single figure illustrates an embodiment of the actuating member of this invention, which in this case is employed for causing a jib or arm 206 of a crane or the like to swing or turn in opposite directions about the upright axis of a fixed pivot provided by a mast 221. The cylinders 217 and 317 of a pair of double acting hydraulic operators 216 and 316 are fixed to a ring 41 which is rotatably mounted on the pivot 221, with the axes of the hydraulic operators normal to the axis of the pivot and at a substantial angle to one another. Because of their connection to the ring 41, the two operators can turn in unison about the axis of the pivot 221. The pistons 218 and 318 of the hydraulic operators have axially extending piston rods 219 and 319.

The jib or arm 206 is carried on a ring-like knuckle member 43 which is also mounted to turn about the pivot 221, so that the jib can swing about the axis of said pivot. Rigidly affixed to the knuckle member, diametrically opposite the jib, is a radially outwardly projecting lug or actuating arm 44, having a transverse yoke 45 at its outer end. Actuating links 220 and 320 connect the two piston rods 219 and 319, respectively, with the ends of the yoke 45, and these links have pivotal connections 224 and 324 with the ends of the yoke, and other pivotal connections 223 and 323 with the outer ends of their respective piston rods.

The pivotal connections 223 and 323 at the ends of the piston rods also swingably secure reaction links 220' and 320' to the rods. The other ends of the links 220' and 320' have pivotal connections 226 and 326 respectively to parts which are fixed with respect to the pivot 221 and spaced from its axis. The pivotal connections 226 and 326 are so located that the reaction links 220' and 320' extend to the sides of their respective piston rods 219 and 319 which are remote from the actuating links 220 and 320 connected thereto. The several pivotal connections, of course, all have their axes parallel to the axis of the pivot 221.

It will be seen that each of the hydraulic operators 216 and 316 is connected across a polygon, in this case a quadrangle. In the case of the operator 216, for example, the sides of the polygon across which it is connected are comprised of the links 220 and 220', the lug or actuating arm 44 (or, more accurately, an imaginary straight line connecting the axis of the pivotal connection 224 with the axis of the pivot 221), and the imaginary fixed lever which connects the pivot axis 221 with the stationary pivotal connection 226. The apexes of each polygon are defined by the several pivot axes (e.g., 221, 224, 223, 226), and an equal number of pivot axes are located at each side of the axis of each hydraulic operator.

To effect counterclockwise rotation of the jib 206, pressure fluid is applied to the double acting hydraulic operator 216 in the direction to retract its piston rod 219 and to the operator 317 in the direction to extend its piston rod 319. As a result, the links 220 and 220' connected to the piston rod 219 are swung toward positions of colinear alignment, while the links 320 and 320' are swung toward positions in which they are superimposed over one another, with the axes of the pivotal connections 323, 324 and 326 disposed in a straight line. With the links in the positions just described, the boom is in its extreme counterclockwise position; and to swing the boom out of that position the pressures in the cylinders 217 and 317 are reversed, that is, the piston rod 319 is retracted and the rod 219 is extended.

It will be observed that at the beginning of the clockwise movement of the boom out of its extreme counterclockwise position, retraction of the piston rod 319 can contribute no torque because it is on dead center with respect to the superimposed links 320 and 320' connected to it, but a torque approaching infinity is created by extension of the piston rod 219, because it is acting at substantially right angles to both links 220 and 220'. As the boom approaches its extreme clockwise position, and the links 320 and 320' approach linear alignment, very slight retarding forces upon the piston rod 319 are sufficient to exert a very high damping or decelerating torque upon the boom.

Thus the actuating mechanism provides for the application of very large torsional moments to the boom when it is in its extreme positions and a load suspended from it must be accelerated, but provides for the application of a lesser torque to the boom in the medial portion of its swing where it is only necessary to overcome motion resistance of the load to keep it swinging. As the boom approaches one of its extreme positions a smooth deceleration is obtained without the need for applying additional force at the hydraulic operators.

From the foregoing description taken together with the accompanying drawings, it will be apparent that this invention provides apparatus for translating axial motion of a reciprocatory actuator such as a hydraulic operator into swinging or turning motion of a part about a fixed axis, whereby a very high torque can be applied to the part during the initial portion of its movement, to effect rapid and smooth acceleration of the part, and whereby smooth and rapid deceleration of the swinging or rotating part can also be effected without the exertion of large forces by the actuator.

What is claimed as my invention is:

1. In combination with a mast, a jib, and a knuckle member by which one end of the jib is journalled on the mast for lateral swinging motion in opposite directions about the mast axis, hydraulically actuated means for imparting swinging movement to the jib, comprising: a pair of hydraulic operators each having relatively axially extensible and retractable elements; means mounting said operators on the mast with their axes transverse to that of the mast, and with one element of each operator constrained to rotary movement about the mast axis so that the outer end portion of the other element of each operator is movable toward and from the mast axis in consequence of its retraction and extension; and a pair of links for each operator, each of the links of each pair having one end pivotally connected to the outer end portion of the extensible and retractable element of the operator, the opposite end of one link of each pair being pivotally connected to the knuckle member at a fixed distance from the mast axis, and the opposite end of the other link of each pair being pivotally connected to a part which is fixed with respect to the mast and spaced from its axis, and all of said pivotal connections having their axes parallel to that of the mast; the links of each pair thereof normally extending to opposite sides of the axis of their operator in divergent relationship to one another, and the angle of divergence of one pair of said links being increased, and the angle of divergence of the other pair of links being simultaneously decreased in consequence of extension of one of the extensible and retractable elements concurrently with retraction of the other, to thus smoothly translate such concurrent actuation of the operators into swinging movement of the jib.

2. Means for swinging a rotatable member in each direction of rotation about a fixed axis, said means comprising: two pairs of links, the links of each pair having adjacent ends pivotally connected to one another; means providing a pair of fixed pivots, one for each pair of links, spaced to opposite sides of said fixed axis and to each of which fixed pivots the other end of one link of its pair is pivotally connected; means pivotally connecting the other end of the other link of each pair to the rotatable member at a location on the latter spaced from said fixed axis; the axes of all of said pivotal connections being parallel to said fixed axis; a pair of hydraulic actuators, one for each pair of links, each of said actuators being of the type comprising a pair of telescoped elongated elements, one of which is extensible and retractable relative to the other; means mounting said other element of each actuator with its axis transverse to said fixed axis and for swinging motion around said fixed axis; and means pivotally connecting the extensible and retractable element of each actuator with the first designated ends of the links of its pair so that upon movement in one direction of said one element of an actuator the links of the pair connected therewith are convergingly swung toward one another, thereby causing the rotatable member to be swung toward the fixed pivot with which said pair of links is connected.

3. Means for effecting motion in opposite directions of a member swingable about a fixed axis, said means comprising: a pair of actuators, each of the type comprising a pair of elongated elements, one of which is coaxially extensible and retractable relative to the other; means mounting said other element of each actuator with its axis transverse to said fixed axis and constraining said other element to swinging movement about said fixed axis; two pairs of links, one pair for the axially extensible and retractable element of each actuator; means pivotally securing the links of each pair to their axially extensible and retractable element with one end of each link of the pair swingable relative to the actuator about an axis parallel to said fixed axis; means pivotally securing the other end of one link of each pair to another fixed axis, said fixed axes to which said links are pivoted being parallel to and spaced to opposite sides of the first designated fixed axis; and means securing the other end of the other link of each pair to the swingable member for pivotal motion relative to the swingable member about an axis parallel to and spaced from the first designated fixed axis.

References Cited in the file of this patent

UNITED STATES PATENTS

| 2,528,985 | Wunsch | Nov. 7, 1950 |
| 2,906,324 | Hannigan | Sept. 29, 1959 |
| 2,906,326 | Hannigan | Sept. 29, 1959 |

FOREIGN PATENTS

| 735,468 | Great Britain | Aug. 24, 1955 |